US011435568B2

(12) United States Patent
Holzapfel et al.

(10) Patent No.: US 11,435,568 B2
(45) Date of Patent: Sep. 6, 2022

(54) DEVICE AND METHOD FOR COUPLING LIGHT OF DIFFERENT WAVELENGTHS INTO A WAVEGUIDE

(71) Applicant: DR. JOHANNES HEIDENHAIN GmbH, Traunreut (DE)

(72) Inventors: Wolfgang Holzapfel, Obing (DE); Michael Kugler, Trostberg (DE); Martin Roetzer, Traunreut (DE); Marco Schade, Traunstein (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 49 days.

(21) Appl. No.: 17/111,557

(22) Filed: Dec. 4, 2020

(65) Prior Publication Data

US 2021/0181492 A1 Jun. 17, 2021

(30) Foreign Application Priority Data

Dec. 12, 2019 (DE) ...................... 10 2019 134 172.8

(51) Int. Cl.
*G02B 21/10* (2006.01)
*G01N 21/64* (2006.01)
(Continued)

(52) U.S. Cl.
CPC ......... *G02B 21/10* (2013.01); *G01N 21/6458* (2013.01); *G02B 6/003* (2013.01);
(Continued)

(58) Field of Classification Search
CPC ...... G02B 21/10; G02B 21/16; G02B 6/0016; G02B 6/003; G02B 6/0031; G02B 6/0068; G02B 21/6458
See application file for complete search history.

(56) References Cited

U.S. PATENT DOCUMENTS 3,724,953 A 4/1973 Johnston
4,815,843 A * 3/1989 Tiefenthaler ........... G02B 6/124
385/12
(Continued)

FOREIGN PATENT DOCUMENTS

EP 2060904 A1 * 5/2009 ......... G01N 21/6458
EP 1327135 B1 2/2010
(Continued)

OTHER PUBLICATIONS

Don S. Goldman, et al., Miniaturized spectrometer employing planar waveguides and grating couplers for chemical analysis, Applied Optics, Nov. 1, 1990, pp. 4583-4589, vol. 29, No. 31, Optical Society of America, Washington, DC, US.

*Primary Examiner* — Leah Simone Macchiarolo
(74) *Attorney, Agent, or Firm* — Leydig, Voit & Mayer Ltd.

(57) ABSTRACT

A device includes a grating coupler with a grating constant, two light sources, and a planar waveguide, which are configured to couple light with two different wavelengths $\lambda_1$, $\lambda_2$ into the waveguide. The waveguide has a waveguiding layer disposed adjacent to a substrate layer and a cover layer. The waveguiding layer has a thickness d and effective refractive indices of $N(\lambda_k, j_k)$, wherein $\lambda_k$ is one of the wavelengths and $j_k$ is an order of a waveguide mode, wherein the coupled light of the wavelength $\lambda_k$ has a coupling angle $\alpha_k$ into the waveguide, and wherein an amount of difference between the coupling angles is a divergence angle $\Delta\alpha$. Guiding of waveguide modes of the order $j_k>0$ is possible for a wavelength of the coupled light. The waveguiding layer is arranged to couple the light via the grating coupler under a divergence angle of $\Delta\alpha<6$.

16 Claims, 6 Drawing Sheets

(51) Int. Cl.
*F21V 8/00* (2006.01)
*G02B 21/16* (2006.01)
*G02B 26/08* (2006.01)

(52) U.S. Cl.
CPC ......... *G02B 6/0016* (2013.01); *G02B 6/0031* (2013.01); *G02B 6/0068* (2013.01); *G02B 21/16* (2013.01); *G02B 26/0816* (2013.01); *G01N 2021/6484* (2013.01)

(56) References Cited

U.S. PATENT DOCUMENTS

| | | |
|---|---|---|
| 5,082,629 A | 1/1992 | Burgess, Jr. et al. |
| 7,879,598 B2 | 2/2011 | Zesch et al. |
| 10,006,866 B2 | 6/2018 | Fattinger |
| 10,684,227 B2 | 6/2020 | Fattinger |
| 2006/0180750 A1* | 8/2006 | Gollier ............... G01N 21/7743 356/128 |

FOREIGN PATENT DOCUMENTS

| | | | |
|---|---|---|---|
| EP | 2618130 A1 | 7/2013 | |
| WO | WO 8607149 A1 | 12/1986 | |
| WO | WO-2019090192 A1 * | 5/2019 | ............. G01N 21/17 |

* cited by examiner

DEVICE AND METHOD FOR COUPLING LIGHT OF DIFFERENT WAVELENGTHS INTO A WAVEGUIDE

CROSS-REFERENCE TO PRIOR APPLICATION

Priority is claimed to German Patent Application No. DE 10 2019 134 172.8, filed on Dec. 12, 2019, the entire disclosure of which is hereby incorporated by reference herein.

FIELD

The present invention relates to a device and a method for coupling light having different wavelengths into a waveguide. The device has a planar waveguide, a grating coupler with a grating constant and at least two light sources. According to an embodiment of the invention, the waveguide is designed in such a way that the guiding of waveguide modes of the order j>0 is possible for at least one wavelength to be coupled. The invention further relates to a method for coupling light from at least two light sources having different wavelengths into a waveguide via a grating coupler having a grating constant. The invention also relates to the use of the device according to the invention and a method for dark field excitation in molography and fluorescence spectroscopy.

BACKGROUND

Waveguides are used in biosensors, for example. Such biosensors, which are based on waveguides, have several advantages: Firstly, the field superelevation of the mode guided in the waveguide allows particularly sensitive measurements on the waveguide surface; and secondly, the dark field excitation enables a spatial separation of excitation and detection, which reduces the scattered light detected (EP 2 618 130 A1, EP 1 327 135 B1).

In particular in the case of applications in fluorescence microscopy, it is customary—for the excitation of different fluorophores—to provide several wavelengths which then have to be coupled into the waveguide. For example, EP 1 327 135 B1 discloses an optical system for determining luminescence, in which light sources having a wavelength of $\lambda_A$=633 nm, $\lambda_B$=532 nm und $\lambda_c$=492 nm are used.

Several wavelengths are also required in the combined application of the molography and fluorescence spectroscopy: one wavelength $\lambda_1$ for the dark field excitation of the molographic detection and another wavelength $\lambda_2$ for the dark field excitation of the fluorescence detection.

In the application of waveguides in optical devices, the light coupling plays a crucial role. This can be done, for example, via a polished end face of the waveguide (end face coupling), via a prism (prism coupling) or via a grating structure (grating coupler). In the context of the present invention, coupling via a grating coupler is of particular interest. The light of the wavelengths used must be coupled into the waveguide of a biosensor at defined coupling angles. The coupling angle is a function of the wavelength of the light to be coupled.

The resonance condition for the coupling of light from the medium air into a grating coupler is generally provided by $$\alpha = \arcsin\left(N - \frac{m\lambda}{\Lambda_K}\right) \quad (1)$$

wherein $\alpha$ denotes the coupling angle, N the effective refractive index of the waveguide (for this wavelength), m the diffraction order of the grating coupler (this is fixed m=1), $\lambda$ the wavelength to be coupled, and $\Lambda_K$ the grating constant of the grating coupler. For different coupling angles $\lambda$, different wavelengths result. The magnitude of the difference between two coupling angles is referred to as divergence angle.

The simplest solution in the sense of a compact optical structure is using two spatially separate grating couplers with two different grating constants $\Lambda_{K,1}$, $\Lambda_{K,2}$ so that the coupling angle $\alpha_1$, $\alpha_2$ for both wavelengths $\lambda_1$, $\lambda_2$ can be adjusted separately to similar values $\alpha_1 \approx \alpha_2$.

A spatial separation of the grating couplers in the propagation direction of the light in the waveguide—i.e. arrangement one behind the other—is, however, very disadvantageous, since light coupled into the first grating coupler is then partially decoupled again during propagation by the spatially separated second grating coupler.

A spatial separation of the grating couplers perpendicular (or obliquely) to the propagation direction of the first wavelength in the waveguide is likewise disadvantageous, since then the installation space of the coupling unit in one direction is drastically increased.

Alternatively the grating coupler can be executed as a bi-diffractive coupler with superposition of grating constants $\Lambda_{K,1/2}$ that satisfies the coupling conditions for both wavelengths at a particular coupling angle $\alpha_1$, $\alpha_2$ each, and which once again can be adjusted to similar values $\alpha_1 \approx \alpha_2$. However, bi-diffractive couplers require a higher manufacturing outlay and are significantly less efficient. In addition, it also applies here that light of the first grating period is again coupled out into interfering orders at the second grating period, which leads to undesired scattered light.

It would therefore be particularly advantageous to use only one grating coupler with a grating constant $\Lambda_K$, via which light of both wavelengths $\lambda_1$, $\lambda_2$ can be coupled.

In this respect, EP 1 327 135 B1 describes a multifacet prism which reduces the divergence angle $\Delta\alpha$ between the excitation light paths having different wavelengths ($\lambda_A$=633 nm, $\lambda_B$=532 nm) by at least a factor of 1.2. For this purpose, a further component must correspondingly be incorporated into the optical path of the device, namely a multifacet prism. The components of an optical device generally have to be adjusted very finely in order to optimally provide the optical path for the irradiated light. Each additional component therefore increases the effort involved in adjustment and at the same time the susceptibility to failure of the entire device.

A further disadvantage of the prism solution is that the pivot point of the angle adjuster lies in the actuated prism and not in the waveguide, so that the point of incidence of the light travels on the waveguide when the angle is adjusted. Therefore, this in turn has to be tracked, optionally iteratively, in order for the grating coupler to be hit. This is disadvantageous in particular if switching is to be carried out with a high switching frequency between different wavelengths.

SUMMARY

In an embodiment, the present invention provides a device which includes a grating coupler with a grating constant, at least two light sources, and a planar waveguide, which are configured to couple light with at least two different wavelengths $\lambda 1$, $\lambda 2$ into the waveguide. The waveguide has a waveguiding layer disposed adjacent to a substrate layer and a cover layer. The waveguiding layer has a thickness d and effective refractive indices of N(λk, jk), wherein λk is one of the wavelengths of the coupled light and jk is an order of a waveguide mode, wherein the coupled light of the wavelength λk has a coupling angle αk into the waveguide, and wherein an amount of difference between coupling angles of different ones of the at least two light sources is a divergence angle Δα. The thickness d and the effective refractive indices of N(λk, jk) of the waveguiding layer are such that guiding of waveguide modes of the order jk>0 is possible for at least one of the at least two different wavelengths of the coupled light. The waveguiding layer is arranged to couple the light having the at least two different wavelengths via the grating coupler under a divergence angle of Δα<6.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

The aim of the invention is therefore to overcome the disadvantages of the prior art and to provide a device and a method which enable the coupling of light from light sources having different wavelengths into a waveguide via a grating coupler having a grating constant, while at the same time having a structure that is compact and robust, i.e. less susceptible to interference.

For this purpose the invention provides a device comprising a grating coupler with a grating period, at least two light sources and a planar waveguide to couple light with at least two different wavelengths ($\lambda_1$, $\lambda_2$) into the waveguide, wherein said waveguide has a waveguiding layer with the effective refractive index $N(\lambda_k, j_k)$, with $\lambda_k$ the wavelength of the coupled light and $j_k$ the order of the waveguide mode, and the thickness d, to which a substrate layer and a cover layer are adjacent; and wherein light of wavelength $\lambda_k$ has a coupling angle $\alpha_k$ into the waveguide; and wherein the amount of the difference between the coupling angles of various light sources is the divergence angle Δα, characterized in that the waveguiding layer has a thickness d and an effective refractive index $N(\lambda_k, j_k)$ so that the guiding of waveguide modes of the order $j_k>0$ is possible for at least one coupled wavelength; and which is arranged to couple light having at least two different wavelengths via the one grating coupler under a divergence angle of Δα<6°.

In addition, the invention provides a method for coupling light from at least two light sources having different wavelengths ($\lambda_1$, $\lambda_2$) via a grating coupler having a grating period into a waveguide, characterized in that
light from at least two light sources having different wavelengths ($\lambda_1$, $\lambda_2$) are irradiated onto the grating coupler;
light of the wavelength $\lambda_1$ with the coupling angle $\alpha_1$ is coupled into the waveguide mode $j_1$ and light of the wavelength $\lambda_2<\lambda_1$ with the coupling angle $\alpha_2$ is coupled into the waveguide mode $j_2$, with $j_2>j_1$;
optionally light from at least one further light source with the wavelength $\lambda_k<\lambda_2<\lambda_1$ is coupled into the waveguide mode $j_k$ with the coupling angle $\alpha_k$, with $j_k>j_2>j_1$;
wherein the amount of difference between the coupling angles from different light sources is Δα<6°.

Additionally, the use of the device according to embodiments of the invention and/or the method according to embodiments of the invention for dark field excitation in molography and fluorescence spectroscopy is described.

If the propagation of light in a waveguide is described with the Maxwell equations and the boundary conditions given by the geometry of the waveguide are taken into account, then the mode equation results in an eigenvalue equation which can only be solved for a discrete finite set of bound light states. These mode equation solutions are referred to as waveguide modes, and/or guided modes, which differ in their effective refractive index N, and whose order is numbered with the mode number j=0, 1, 2, . . . . Depending on the irradiated polarization (transverse electrical, TE or transverse magnetic, TM) the modes guided in the planar waveguide are then referred to as TE0, TE1, . . . and TM0, TM1 . . . .

In principle, the polarization can be freely selected. Since the effective index of refraction of TE and TM modes differs only slightly (particularly for small mode numbers j), the divergence angle Δα cannot be reduced below 6° just by the combination of TM and TE modes. Furthermore, the structure of the grating coupler generally already determines which polarization is used, since the coupling gratings generally operate particularly effectively for polarization. In embodiments of the present invention, TE modes or TM modes or a combination thereof may be used.

The effective refractive index N of the waveguide for a particular wavelength λ is dependent on the order of the guided waveguide mode j so that the effective refractive index for higher order waveguide modes decreases. The reason for the lower effective refractive index N in the case of higher-order waveguide modes is that their electric field extends further into the surrounding substrate and media material. This has a lower refractive index than the material of the waveguiding layer, as a result of which the effective refractive index of the waveguide mode decreases.

The coupling angle is thus also dependent on the mode order as follows:

$$\alpha = \arcsin\left(N(\lambda_k, j_k) - \frac{\lambda_k}{\Lambda_K}\right) \quad (2)$$

Biosensors based on planar waveguides are generally used with single-mode waveguides, i.e. the light of different wavelengths is coupled into the mode of the order j=0 of the waveguide in order not to allow additional scattered light channels through intermode scattering. For this purpose, waveguides whose thickness d and effective refractive index N are selected in such a way that only the fundamental mode (mode number j=0, i.e. TE0 or TM0) can be guided are then used for this purpose. However, this has the result that the coupling angles of light of different wavelengths differ greatly, and in general the coupled wavelengths have a divergence angle greater than 6°.

Surprisingly, however, it has been found that it is possible to reduce the divergence angle to below 6° by omitting the requirement for single mode. This results in an additional flexibility, namely the order j of the mode guided in the waveguide.

For given wavelengths $\lambda_1$, $\lambda_2$, a combination of effective refractive indices of $N(\lambda_1, j_1)$, $N(\lambda_2, j_2)$ and common grating constant $\Lambda_K$ can be found, for which the coupling conditions for light of the wavelength $\lambda_1$ into the waveguide mode $j_1$ are met for a coupling angle $\alpha_1$, and at the same time the coupling condition for light of the wavelength $\lambda_2 < \lambda_1$ in the mode $j_2$ with $j_2 > j_1$, generally $j_2 = j_1 + 1$ for a coupling angle of $\alpha_2 \approx \alpha_1$ is met, hence:

$$\alpha_1 = \arcsin\left(N(\lambda_1, j_1) - \frac{\lambda_1}{\Lambda_K}\right) \approx \alpha_2 = \arcsin\left(N(\lambda_2, j_2) - \frac{\lambda_2}{\Lambda_K}\right) \quad (3)$$

To be clear, the lower effective refractive index $N(\lambda_2, j_2)$ of the higher waveguide mode $j_2$ offsets the smaller wavelength $\lambda_2$, so that both coupling angles $\alpha_1$ and/or $\alpha_2$ are closer together or even identical. Free parameter to satisfy the condition $\alpha_1 \approx \alpha_2$ via appropriate effective refractive indices of the respective waveguide modes, in addition to the order of the waveguide modes, is above all the layer thickness of the waveguiding material.

Accordingly, the invention provides a suitable combination of effective refractive indices N and grating constant $\Lambda_K$, for which the coupling angles $\alpha_1$ and $\alpha_2$ are similar. This is achieved by coupling into a higher mode for the shorter wavelength.

TM modes have a slightly lower effective refractive index than TE modes of the same order j. Thus the objective according to an embodiment of the invention of compensating the shorter wavelength $\lambda_2$ by a lower effective refractive index $N(\lambda_2, j_2)$ can be supported in one embodiment of the invention in such a way that a TM-mode with $N(\lambda_2, j_2)$ is selected for $\lambda_2$ and a TE mode with $N(\lambda_1, j_1)$ is selected for $\lambda_1$. This has the additional advantage that on the detection side the individual wavelengths can be separated again via their polarization by means of a suitable analyzer, for example a polarizer.

A planar waveguide according to an embodiment of the invention is a waveguide comprised of a waveguiding layer having a refractive index $n_W$ sandwiched between two layers having a lower refractive index. According to an embodiment of the invention, a substrate layer having a refractive index $n_S$ and a cover layer having a refractive index $n_D$ are adjacent to waveguiding layer.

In one embodiment of the invention, the waveguiding layer of the waveguide has a material from the group comprising $Ta_2O_5$, $Si_3N_4$, $SiO_xN_y$, $TiO_2$, SiC or combinations thereof. The waveguiding layer of the waveguide particularly preferably comprises $Ta_2O_5$.

In one embodiment of the invention, the substrate layer comprises a material selected from the group consisting of D263, float glass, borofloat, and herasil. The substrate layer particularly preferably comprises D263.

In a further embodiment of the invention, the cover layer comprises a material selected from the group comprising $SiO_2$, water, DMSO and air, or a combination thereof. If the cover layer has a combination of materials, a cover layer of a material having the refractive index $n_{D1}$ is adjacent to a part of the waveguiding layer and a cover layer of a material having the refractive index $n_{D2}$ is adjacent to a further part of the waveguiding layer. In one embodiment of the invention, a cover layer of $SiO_2$ is adjacent to a part of the waveguiding material and a cover layer of air or water adjoins a further part of the waveguiding layer. In a particularly preferred embodiment, a cover layer of $SiO_2$ adjoins the waveguiding layer in the area of the grating coupler, while outside this area, a cover layer of water or air is adjacent to the waveguiding layer.

In the context of an embodiment of the invention, light of the wavelength $\lambda_k$ is coupled into the waveguide with a coupling angle $\alpha_k$, wherein the magnitude of the difference between the coupling angles of different light sources of the divergence angles is $\Delta\alpha$.

In accordance with an embodiment of the present invention, the divergence angle is $\Delta\alpha < 6°$, preferably $\Delta\alpha < 3°$, particularly preferably $\Delta\alpha \approx 0°$.

In a particularly advantageous embodiment of the present invention, the divergence angle is equal to or less than the resonance width or the acceptance angle of the grating coupler. In this case, light bundles having these wavelengths can advantageously be coupled into the waveguide simultaneously via the grating coupler.

Suitable grating couplers which are used in the device according to an embodiment of the invention have a grating constant $\Lambda_K$ in the range from 200 nm to 700 nm, preferably from 300 to 500 nm, particularly preferably of 360 nm.

The effective refractive index N of the waveguiding layer of the waveguide $\lambda$ depends on the wavelength of the incident light, the order of the waveguide mode j, the refractive indices of the substrate $n_S$, of the waveguide $n_W$ and the covering layer $n_D$ as well as the waveguide thickness d. The eigenvalue equations resulting for asymmetric layer waveguides for determining the effective refractive indices N cannot be calculated analytically, but must be solved numerically.

According to an embodiment of the invention, the thickness of the waveguiding layer must be selected in such a way that the higher waveguide mode in the waveguide is permitted for the shorter wavelength. Since the effective refractive index for specified materials of the waveguiding layer, the substrate layer and the cover layer, as well as known wavelength and polarization of the incident light is only a function of the thickness d, $N(\lambda_k, j_k) = N(\lambda_k, j_k, d)$ applies, and the appropriate waveguide design can be derived.

For identical grating constants $\Lambda_K$ and a predetermined divergence angle $\Delta\alpha$ (usually $\Delta\alpha = 0$), one can obtain the modes $j_1$, $j_2$ for two wavelengths $\lambda_1$, $\lambda_2$, and without loss of generality $\alpha_2 = \alpha_1 + \Delta\alpha$ by equalizing the two formulas from equation (3), the following equation results:

$$\arcsin\left(N(\lambda_1, j_1, d) - \frac{\lambda_1}{\Lambda_K}\right) = \arcsin\left(N(\lambda_2, j_2, d) - \frac{\lambda_2}{\Lambda_K}\right) - \Delta\alpha \quad (4)$$

All parameters are known except for the waveguide thickness d, after numerically solving the equation, this is obtained as a function of the divergence angle $\Delta\alpha$.

According to an embodiment of the invention, the thickness d of the waveguiding layer and its effective refractive index N are selected such that the guiding of waveguide modes of order $j>0$ is possible for at least one coupled wavelength.

This approach also works for coupling light from more than two light sources of different wavelengths and is in practice limited only in that because of $n_W>N>\max(n_D, n_S)$, the effective refractive index for higher order waveguide modes cannot fall indefinitely. This means that the effective refractive index is greater than the refractive index of both substrate and cover layer $\max(n_D, n_S)$.

In one embodiment of the invention, light is coupled from at least two light sources having different wavelengths, preferably light from two to four light sources having different wavelengths is coupled, particularly preferably light is coupled from precisely two light sources having different wavelengths.

The device according to an embodiment of the invention is advantageous in particular for use in fluorescence detection in combination with molography, in which the irradiated excitation light (and thus also the scattered light generated) is spectrally separated from the emitted signal light by the Stokes shift and can thus be filtered accordingly.

In the selection of the two wavelengths for the excitation of the molography and the fluorescence, the following boundary conditions must be taken into account: With respect to the molographic detection, the required grating period $\Lambda_M$ of the mologram depends on the wavelength $\lambda_1$ of the incident light and the effective refractive index $N(\lambda_1, j_1)$ of the waveguide, typically it is approximately half the vacuum wavelength of the incident light. Since such fine structures mean an associated production expenditure, a wavelength $\lambda_1$ which is as large as possible is desired in order to enable mologram structures with as coarse a grating constant $\Lambda_M$ as possible.

At the top, however, the wavelength $\lambda_1$ is limited by the fact that the absorption of water increases ever further for higher wavelengths and that conventional silicon-based photo-detectors can no longer be used in ranges about 1000 nm. Overall, therefore, a reasonable wavelength range of 600-1000 nm results for $\lambda_1$.

With respect to fluorescence detection, efficient fluorophores, in particular fluorescent recombinant proteins, are almost exclusively available in the visible wavelength range of 400-700 nm, limiting the choice of wavelength for the fluorescence excitation to $\lambda_2<\lambda_1$. Furthermore, it must be ensured that the fluorophores used, which have their excitation spectrum at $\lambda_2$ cannot also be excited with the wavelength $\lambda_1$. That is to say that upon switching on the light source of the wavelength $\lambda_1$ for the molographic detection, fluorophores would constantly be excited, thus creating free radicals which influence the biological processes to be investigated or bleach the fluorophores. The fact that the absorption spectrum of a fluorophore falls rapidly to longer wavelengths is helpful here. In order to ensure that the absorption of the fluorophore at $\lambda_1$ has dropped to about zero, i.e. $A_{ex}(\lambda_1) \approx 0$, a spectral safety distance of about 50-100 nm should be maintained. In addition, if it is to be ensured that the emission spectrum of the fluorophore used has also fallen to approximately zero at $\lambda_1$, i.e. $I_{em}(\lambda_1) \approx 0$, this safety distance must even be increased by the Stokes shift of about 25 nm and the slower decrease in the emission spectrum toward long wavelengths must be taken into account. This results in a reasonable minimum spacing of $\Delta\lambda=\lambda_1-\lambda_2 \approx 100$ nm.

In a preferred embodiment of the invention, the wavelengths ($\lambda_1, \lambda_2, \ldots \lambda_k$) of the light of the light sources that are coupled differ by at least $\Delta\lambda=150$ nm, particularly preferably by at least $\Delta\lambda=100$ nm.

In this special case, it is therefore possible to select a light source with a wavelength of $\lambda_1=780(\pm10)$ nm for the dark field excitation of the molographic detection, and a light source with a wavelength of $\lambda_2=660(\pm10)$ nm for the dark field excitation of the fluorescence detection.

In one embodiment of the invention, a light source has a wavelength in the range of 600 nm-1000 nm, preferably in the range of 700 nm-900 nm, particularly preferably of $780(\pm10)$ nm, and a further light source has a wavelength in the range of 400 nm-700 nm, particularly preferably of $660(\pm10)$ nm.

In this example, this results in two wavelengths $\lambda_1=780$ nm, $\lambda_2=660$ nm which differ by approximately 20%, wherein the light of these two wavelengths must advantageously be coupled into the same waveguide in the experimental implementation. When using a single mode waveguide from the state of the art, a divergence angle is obtained that is greater 6°, so that the light to be coupled then has to be irradiated from correspondingly different directions. If the excitation light of different light sources from a plurality of different spatial directions is directed to a common target, namely the grating coupler, from a larger distance, a correspondingly large amount of space must be made available in an optical device, which is often not present.

The device according to an embodiment of the invention allows the coupling in of the light of the one wavelength $\lambda_1$ in a first mode of the order $j_1=0, 1, 2, \ldots$ of the waveguide and the coupling of the light of a shorter wavelength $\lambda_2$ into a further mode of the order $j_2$ of the waveguide, with $j_2>j_1$. The materials and the thickness d of the waveguiding material are selected according to an embodiment of the invention in such a way that the formula (4) is fulfilled and the divergence angle is $\Delta\alpha<6°$. This offers the advantage that a compact design of the device is possible in that different excitation light sources can be combined at a common location.

Suitable light sources are all light sources that can provide light in the described wavelength range, such as lasers, laser diodes, light emitting diodes, etc.

In the production of planar waveguides, production tolerances can occur above all at the layer thickness d and the refractive index $n_W$ of the waveguide material, which can shift the coupling angles of the irradiated light $\alpha_1$, $\alpha_2$ independently of one another by about +/−1°. However, since the resonance width or the acceptance angle of the grating coupler is only about 0.1°, fine adjustment, i.e. an adjustment of the coupling angle, still has to be provided in order to be able to always fulfill the coupling condition.

In order to be able to dispense with a disadvantageous actuation of the waveguide/bio-chip when adjusting the coupling angle, a virtual pivot goniometer as disclosed in U.S. Pat. No. 3,724,953 can be used. In this angle adjuster, the real pivot point of a mirror is mapped to a virtual pivot point with the aid of a suitable lens arrangement, so that the point of impact of the light does not migrate when the angle is adjusted. In this invention, the virtual pivot point is the grating coupler. This goniometer structure provides an angular adjustment range of about +/−6°, which is sufficient to compensate for variations in the layer thickness or refractive index of the waveguiding layer (both influencing the effective refractive index N of the waveguide and thus the coupling angle $\alpha$).

The use of such a goniometer structure is only possible because the divergence angle $\Delta\alpha$ according to an embodiment of the invention is less than 6°. For this purpose, two separate goniometers would be required for the two wavelengths $\lambda_1$, $\lambda_2$ in the case of $\Delta\alpha>6°$, which are located in the two optical paths directed from different spatial directions onto the grating coupler. However, such a construction would be disadvantageous because of the material costs and the required installation space. However, since the reduced divergence angle of $\Delta\alpha<6°$ obtained by the above solution is within the adjustment range of the virtual pivot goniometer, the light of both wavelengths can be irradiated onto the grating coupler from the same spatial direction, and only one goniometer is then necessary in this common optical path for fine adjustment of the coupling angles $\alpha_1$, $\alpha_2$. Thus, various embodiments of the device according to the invention can be proposed which, according to the invention, are advantageously distinguished by a low material outlay and small installation space.

In one embodiment of the invention, the device therefore continues to have a goniometer structure which has at least one rotary mirror, two lenses and a virtual pivot point on the grating coupler. Wherein a first lens L1 has focal length $f_1$ and second lens L2 has focal length $f_2$. Suitable lenses are, for example, plane-convex, biconvex, concave-convex or diffractive lenses in cylindrical, spherical or free (aspherical) form. At least one rotating mirror is arranged between the two lenses and has a distance $s_1$ relative to the lens L2. The lens L2 in turn has a distance $s_2$ to the waveguide plane.

In one embodiment of the invention, the device has a goniometer structure with a rotary mirror, two lenses and a virtual pivot point on the grating coupler. The basic idea of such a goniometer design is described in U.S. Pat. No. 3,724,953.

In one embodiment of the invention, light having different wavelengths $\lambda_1, \lambda_2, \ldots \lambda_k$ is directed onto a grating coupler as a common point of impact collinearly combined by the virtual pivot goniometer. The light with different wavelengths $\lambda_1, \lambda_2, \ldots \lambda_k$ can be collinear combined with the aid of a beam combiner, for example. For this, the light beams pass through a collimating lens before the beam combiner. The collimating lens can be, for example, a converging lens, in the focal point of which the light sources are located. Alternatively, the light beams can leave a laser diode already collinearly combined if a common light source is used in the form of active zones integrated on a substrate within the laser diode.

In one embodiment of the invention, the two lenses L1 and L2 are arranged in such a way that the optical path $d_{L1,L2}$ between the lenses corresponds to the sum of the respective focal distances $f_1$ and $f_2$, hence $d_{L1,L2}=f_1+f_2$. This condition ensures that a collimated irradiated light beam leaves the goniometer collimated again.

In a further embodiment of the invention, the two lenses L1 and L2 are arranged such that the path between the lenses is the sum of the respective focal lengths, i.e., $d_{L1,L2}>f_1+f_2$. In this case, a convergent exiting light bundle will be provided. In this way, the beam incident on the grating coupler has a higher angular spectrum, so that the coupling condition can be met more easily.

In a further embodiment of the invention, the two lenses L1 and L2 are arranged such that the path between the lenses is smaller than the sum of the respective focal lengths, i.e. $d_{L1,L2}<f_1+f_2$. In this case, a divergently emerging light bundle will be provided. In this way, the beam incident on the grating coupler likewise has a higher angular spectrum, so that the coupling condition can be met more easily.

The waveguide with grating coupler is positioned in such away that the distance of the rotating mirror to lens L2 ($s_1$) and the distance of the lens L2 to the wave guide plane ($s_2$) behave according to the image equation as $1/s_1+1/s_2=1/f_2$. This condition ensures that the imaging of the real pivot point generated by lens L2 coincides with the plane of the waveguide so that when the angle is adjusted, the point of incidence of the light does not migrate.

In this way, the required coupling angles for the different wavelengths can be set. For example the coupling angle $\alpha_1$ for the wavelength $\lambda_1$ that is coupled into the mode $j_1$ of the waveguide, and $\alpha_2$ for the wavelength $\lambda_2$, that is coupled into the mode $j_2$ of the waveguide, can be adjusted.

In a further embodiment of the invention, the goniometer structure has several rotary mirrors, particularly preferably two rotary mirrors. Such a construction is advantageous in order to couple the light of a single respective light source having a wavelength into the waveguide with each independently rotary mirror. The light from several light sources having different wavelengths can thus be coupled simultaneously. This is advantageous if the divergence angle $\Delta\alpha$ is the same for the light sources as the resonance width of the grating coupler.

For example, with two independent rotation mirrors D1, D2, two coupling angles $\alpha_1$, $\alpha_2$ can be individually set, so that correspondingly light having two wavelengths can be coupled into the waveguide at the same time. This is particularly advantageous if the divergence angle $\Delta\alpha$ between the two wavelengths is the greater than the resonance width of the grating coupler.

The invention therefore provides an embodiment in which at least one light source is arranged at an angle $\beta$ sheared in a plane parallel to the planar waveguide. In this way, space is created for a further rotary mirror, wherein, however, both lenses L1, L2 of the goniometer structure with a virtual pivot point continue to be traversed jointly by all light sources.

In a preferred embodiment of the invention, the device comprises two light sources, one light source of which is arranged at an angle $\beta$ sheared in a plane parallel to the planar waveguide.

In one embodiment of the invention, the light source used for fluorescence spectroscopy and thus having the fluorescence wavelength $\lambda_2$ is arranged sheared at an angle $\beta$ in a plane parallel to the planar waveguide.

In a further embodiment according to the invention, the device has two light sources, wherein the first light source is arranged at an angle $\beta$ sheared in a plane parallel to the planar waveguide, and the second light source is arranged at an angle $\beta$ sheared in a plane parallel to the planar waveguide.

The sheared beam impinges on the grating coupler at an angle $\alpha$, $\beta$. It should be noted that the coupling angle of the corresponding optical path is slightly changed as a result of the shearing $\beta$. The formula for determining the coupling angle must be correspondingly expanded by the angle $\beta$, resulting in:

$$\alpha = \arcsin\left(\sqrt{N(\lambda, j)^2 - \sin^2\beta} - \frac{\lambda}{\Lambda_K}\right) \quad (5)$$

This must be taken into account accordingly in the calculation for the minimization of the divergence angle according to formula (3) or (4) in order to nevertheless obtain $\Delta\alpha<6°$.

Advantageously, only one goniometer structure is required in this embodiment, and therefore the advantages already mentioned, the reduction of material expenditure and installation space, are also retained in this embodiment.

Due to the pulse retention, the light incident at the sheared angle also runs slightly obliquely in the waveguide. By slightly broader illumination of the grating coupler, however, the region of interest can be fully illuminated again at all wavelengths.

In one embodiment of the invention, therefore, at least the irradiated light of the wavelength $\lambda_k$ of a light source along the grating coupler has a line profile.

The generation of these line profiles can be achieved according to an embodiment of the invention either by widening in the corresponding dimension, for example with the aid of cylindrical lenses or Powell lenses, or by scanning the light beam with the aid of a rotating polygonal beam offset prism. Such an embodiment is advantageous in order to be able to illuminate the waveguide over its entire width. When using line illumination, in particular shearing of one or more light sources, which are coupled into a waveguide according to an embodiment of the invention, is less of a concern.

In one embodiment of the present invention. beam forming means are telescopically arranged. In a particularly preferred embodiment of the invention, a Powell lens and a cylindrical lens are arranged one after the other. The Powell lens expands the light divergently in one axis and the expanded light bundle is collimated again in an axis by the cylindrical lens.

According to an embodiment of the invention, the two beam bundles are shaped in such a way that a line is formed along the grating coupler, so that the waveguide can be illuminated over its entire width.

In one embodiment of the invention, the device therefore furthermore has at least one light-shaping means in the form of a cylindrical lens and/or a Powell lens and/or a rotating polygonal beam offset prism, which are arranged between the light source and the first lens of the goniometer structure.

All features described for the device according to embodiments of the invention are also used in the method according to embodiments of the invention described below, and vice versa.

An embodiment of the invention further provides a method by means of which light from at least two light sources having different wavelengths ($\lambda_1, \lambda_2$) can be coupled into a waveguide via a grating coupler having a grating period. According to an embodiment of the invention, light from at least two light sources with different wavelengths ($\lambda_1, \lambda_2$) is irradiated on the grating coupler and the light of the wavelength $\lambda_1$ with the coupling angle $\alpha_1$ is coupled into the waveguide mode $j_1$ and light in the wavelength $\lambda_2<\lambda_1$ with the coupling angle $\alpha_2$ is coupled into the waveguide mode $j_2$, with $j_2>j_1$. Optionally, light from at least one further light source with the wavelength $\lambda_k<\lambda_2<\lambda_1$ and the coupling angle $\alpha_k$—can be coupled into the waveguide mode $j_k$, with $j_k>j_2>j_1$.

In one embodiment of the method according to the invention, light from four light sources having different wavelengths is coupled into the waveguide. Light from three light sources having different wavelengths is preferably coupled into the waveguide. Light from two light sources having different wavelengths is particularly preferably coupled into the waveguide.

According to an embodiment of the invention, the absolute value of the difference between the coupling angles (divergence angles) of different light sources is $\Delta\alpha<6°$, preferably $\Delta\alpha<3°$, particularly preferably $\Delta\alpha\approx0°$.

In a particularly advantageous embodiment of the present invention, the divergence angle is equal to or less than the resonance width or the acceptance angle of the grating coupler. In this case, light bundles having these wavelengths can advantageously be coupled into the waveguide simultaneously via the grating coupler.

In one embodiment of the invention, the light of at least two light sources having different wavelengths is coupled into the waveguide by a goniometer structure having a virtual pivot point on the grating coupler.

According to an embodiment of the invention, a beam bundle of a wavelength passes through a first lens after exiting from a light source and then strikes a rotary mirror which directs the beam bundle onto a further lens. After passing through the second lens, the beam bundle strikes the grating coupler via which the beam bundle is coupled into the waveguide.

In one embodiment of the invention, the light of at least two light sources with different wavelengths is coupled collinearly into the waveguide. The goniometer structure according to an embodiment of the invention makes it possible for a light bundle that is irradiated collimated into the goniometer structure to leave this structure collimated again.

Furthermore, the structure of the goniometer according to an embodiment of the invention ensures that the imaging of the real pivot point generated by the lens closer to the waveguide coincides with the plane of the waveguide, so that the point of incidence of the light does not migrate when the angle is adjusted. In this way, the required coupling angles $\alpha_1$ for the wavelength $\lambda_1$ which is coupled into the modes $j_1$ of the waveguide, and $\alpha_2$ for the wavelength $\lambda_2$ which is coupled into the mode $j_2$ of the waveguide, can be adjusted without the angle of the impact point migrating on the grating coupler.

Furthermore, in one embodiment of the invention, the light of at least two light sources having different wavelengths is coupled into the waveguide at the same time. The advantage of this embodiment is that light of several wavelengths can be coupled into one waveguide at the same time without loss of time when switching between wavelengths.

For this purpose, in one embodiment of the invention, the light of the at least two light sources having different wavelengths is conducted simultaneously via a rotary mirror and coupled into the waveguide. This embodiment is used when the divergence angle $\Delta\alpha$ is the same or smaller than the resonance width of the grating coupler.

If the divergence angle $\Delta\alpha$ is greater than the resonance width of the grating coupler, in one embodiment of the method according to the invention, one wavelength each can be coupled into the waveguide depending on the position of the rotary mirror, and by adjusting the rotary mirror, one can switch between different wavelengths with a high frequency (>1 Hz).

In a further embodiment of the method according to the invention, the light having a first wavelength and at least the light having a second wavelength are therefore coupled successively into the waveguide.

In a further embodiment of the invention, the light of at least two light sources having different wavelengths is conducted simultaneously over several rotary mirrors and coupled into the waveguide, the light of one wavelength being guided over a first rotary mirror and the light having a further wavelength being guided via a further rotary mirror.

In this embodiment, at least the optical path of the first wavelength light is sheared at an angle β in a plane parallel to the waveguide. The light beam of the light source whose optical path has been sheared by the angle β passes through the first lens and is directed onto the second lens by the rotary mirror. This directs the sheared beam onto the grating coupler where it impinges at an angle α, β.

In a further embodiment of the invention, the light is sheared from two light sources, preferably symmetrically to a plane parallel to the waveguide, i.e. the light of a light source is incident around the angle β and the light of a further light source around the angle −β. The angles β that are present can be chosen essentially freely as long as there is enough space for a separation of the wavelengths on the two rotary mirrors, depending on the beam diameter.

The formula for determining the coupling angle must be extended accordingly by the angle β. This is taken into consideration in formula (5).

This embodiment has the advantage that light from different light sources can be coupled into the waveguide simultaneously via the grating coupler. In particular, this embodiment can be used when the divergence angle is Δα<6° but is greater than the resonance width of the grating coupler, which is typically in the range of 0.1°. There is the advantage that light of different wavelengths can be coupled into the waveguide simultaneously without adjusting the angle. The simultaneous coupling of light of different wavelengths therefore saves a considerable amount of time.

In a further embodiment of the invention, the light of at least one light source is shaped. In one embodiment of the invention, the light of at least one light source is shaped so that a line profile results along the grating coupler.

In one embodiment of the invention, the light from each light source is shaped.

Preferably, the light of at least one light source is shaped into a line profile in which the light beam passes through at least one cylindrical lens and/or a Powell lens after leaving the light source or is scanned by a rotating polygonal beam offset prism. The light beam thus formed then passes through the goniometer structure already described, impinges on the grating coupler and is coupled into the waveguide. According to an embodiment of the invention, the beam is shaped in such a way that a line results along the grating coupler and the waveguide is thus advantageously illuminated over its entire width.

In a further embodiment of the invention, the light of each light source is shaped and thereby collinearly combined. This is preferably done by at least one beam combiner and/or at least one collimating lens. The beam combiner and/or collimating lens are preferably arranged downstream of the light sources. A collimating lens is for example a converging lens.

In one embodiment of the invention, at least one light-shaping means is arranged in the optical path of each light beam of one wavelength. In a preferred embodiment, at least one light-shaping means can be arranged in the optical path of several light beams having different wavelengths, so that at least one light-shaping means extends spatially over the optical path of several light sources.

Embodiments of the present invention offers particular advantages over the prior art, by:

the reduction of the divergence angle to Δα<6° without the aid of additional optomechanical components, such as a multifacet prism;

the realization of an angular adjuster designed as a virtual pivot goniometer for several wavelengths in which the point of incidence of the light on the waveguide does not change during the adjustment of the angle due to the reduction of the divergence angle to Δα<6°.

The invention further relates to the use of the device according to embodiments of the invention and/or the method according to embodiments of the invention for dark field excitation in molography and fluorescence spectroscopy.

The invention is explained in more detail below with reference to four figures and two exemplary embodiments.

Figure 1:
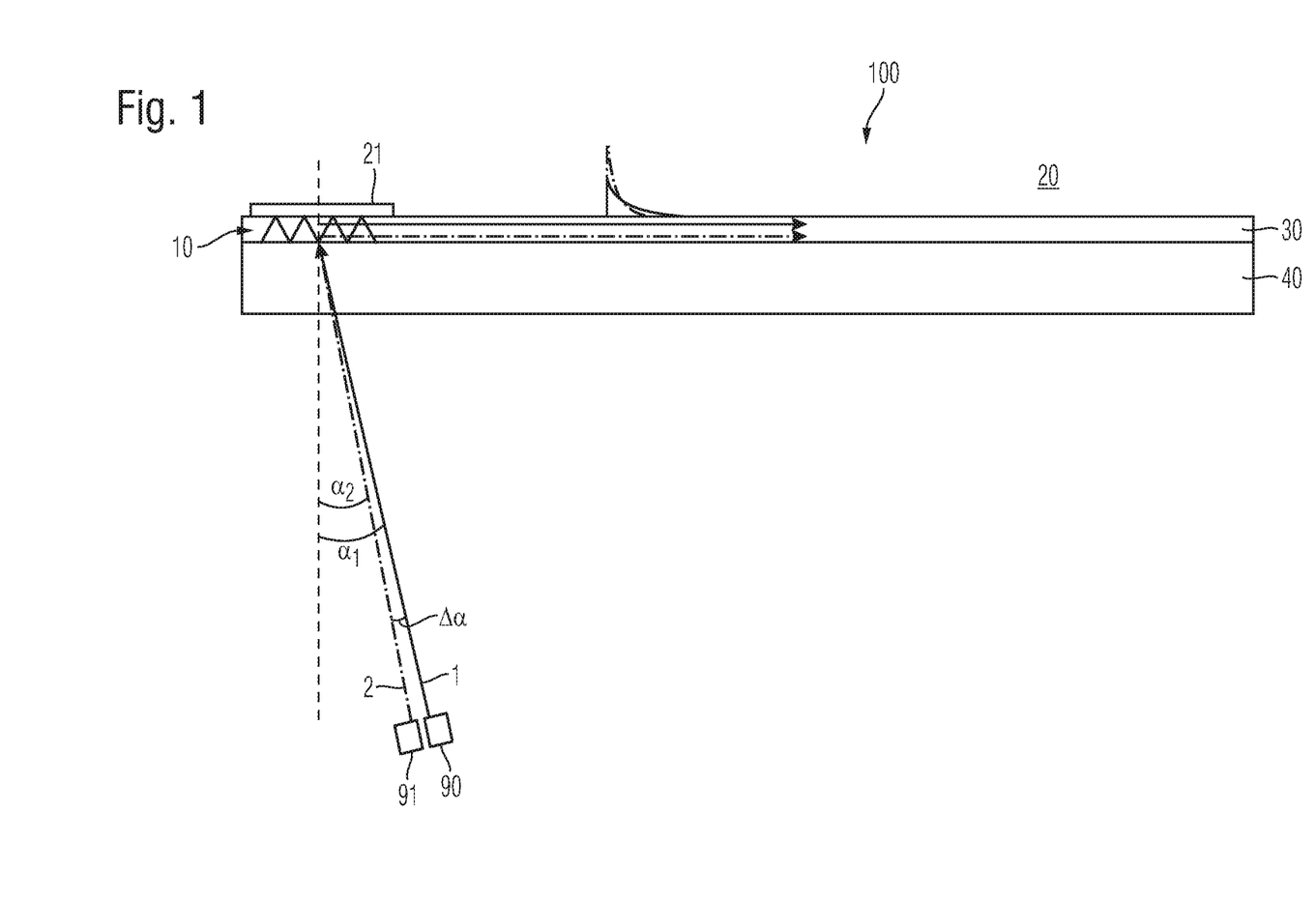
FIG. 1 shows a schematic representation of the coupling of light of two different wavelengths into two different waveguide modes.

FIG. 1 schematically shows the waveguide with a grating coupler 10. The waveguide consists of a waveguiding layer 30 of thickness d adjacent to a substrate layer 40 and a capping layer formed of layers 20 and 21. The layer 20 consists, for example, of air or water and has a refractive index $n_{D1}$, and the layer 21 consists, for example, of $SiO_2$ and has a refractive index $n_{D2}$. The material of the substrate layer has a refractive index $n_S$ and the material of the waveguiding layer has a refractive index $n_W$. The refractive index of the cover layer and of the substrate layer is always smaller than the refractive index of the waveguiding layer. If the propagation of light in a waveguide is described with the Maxwell equations and the boundary conditions given by the geometry of the waveguide are taken into account, then the mode equation results in an eigenvalue equation which can only be solved for a discrete finite set of bound light states. The mode equation solutions are the so-called waveguide modes which differ by their effective refractive indices N and whose order is numbered with the mode number j. For the effective refractive index N, $n_W>N>\max(n_D, n_S)$ applies, wherein $\max(n_D, n_S)$ refers to the maximum, i.e. the greater of the two refractive indices $n_D$, $n_S$.

According to an embodiment of the invention, the light of at least two light sources 90, 91 is coupled via a grating coupler 10 having a grating constant $\Lambda_K$. Light 1 of the wavelength $\lambda_1$ is coupled into the waveguide mode $j_1$ with the coupling angle $\alpha_1$ and light 2 of the wavelength $\lambda_2<\lambda_1$ is coupled into the waveguide mode $j_2$ with the coupling angle $\alpha_2$, where is $j_2>j_1$. Since the effective refractive indices N are different for different modes in the waveguide, the coupling angle also changes accordingly. The modes $j_1$ and $j_2$ into which the light of at least two light sources 90, 91 is coupled, and the structure of the waveguide, are selected according to an embodiment of the invention in such a way that the coupling angles $\alpha_1$ and $\alpha_2$ differ by a maximum of 6°. This means that the divergence angle $\Delta\alpha=|\alpha_1-\alpha_2|$ is Δα<6°.

Figure 2:
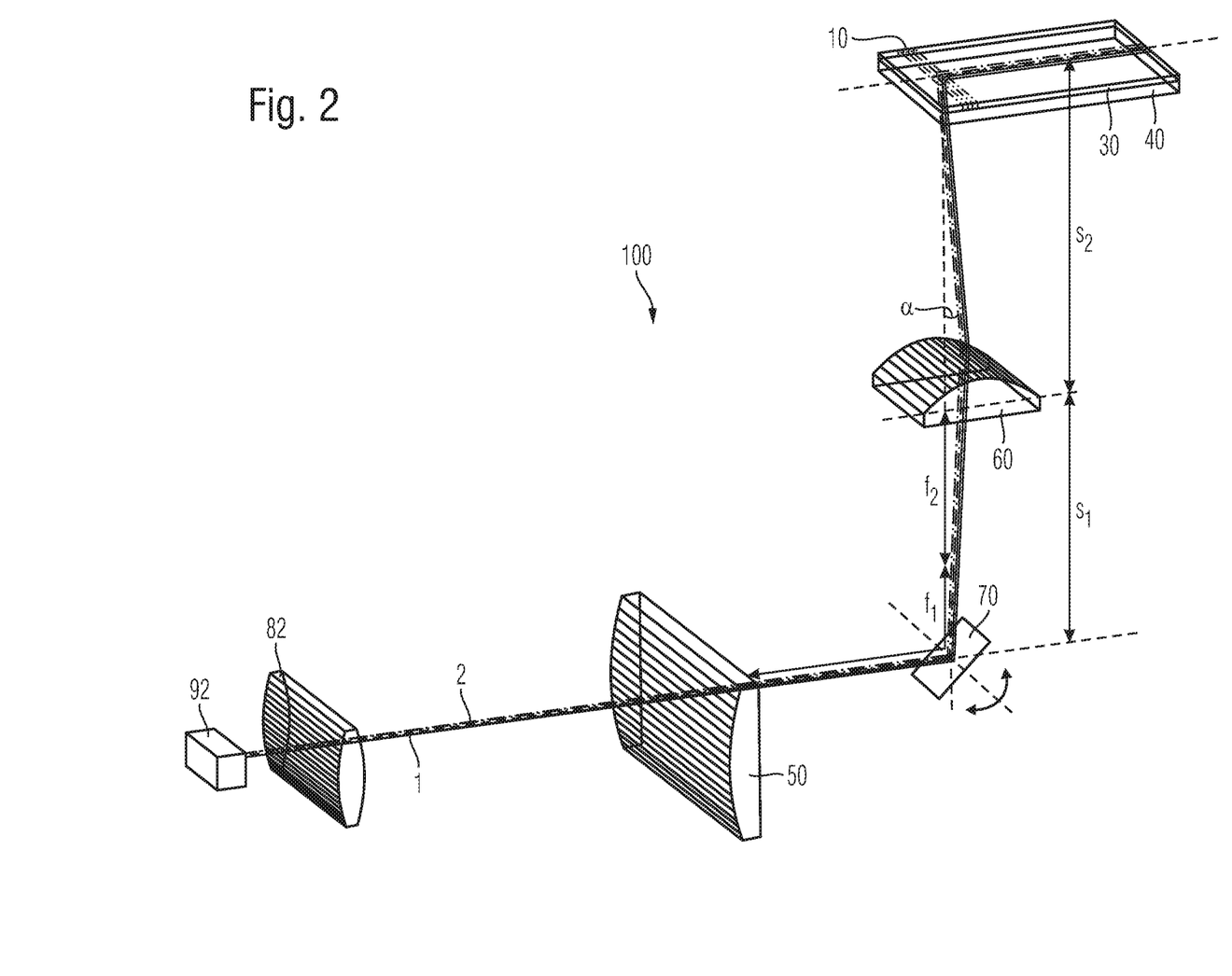
FIG. 2 shows the coupling of light of two wavelengths which is collinearly coupled into a waveguide by a virtual pivot goniometer structure on the grating coupler.

FIG. 2 shows an embodiment of the device 100 according to an embodiment of the invention with a goniometer structure. The goniometer structure comprises a first lens 50, a rotary mirror 70 and a second lens 60. The light source 92 comprises two light sources arranged so close to each other that, after passing through the converging lens 82, the light beams 1, 2 strike the lens 50 in a collinear combined manner. The converging lens 82 functions as a collimating lens. The lens 50 and the lens 60 are arranged in the FIG. 2 in such a way that the optical path between the lenses corresponds to the sum of the focal length $f_1$ of the lens 50 and the focal length $f_2$ of the lens 60. In other embodiments of the inventive device 100, the optical path between the lenses 50, 60 may also be the same or less than the sum of the respective focal values of the lenses 50 and 60.

Furthermore the waveguide with grating coupler 10 is positioned in such away that the distance $s_1$ from the rotary mirror 70 to the second lens 60 and the distance $s_2$ of the second lens 60 for to the wave guide plane correspond to the image equation $1/s_1 + 1/s_2 = 1/f_2$ behavior. This condition ensures that the imaging of the real pivot point generated by the second lens 60 coincides with the plane of the waveguide so that when the angle is adjusted, the point of incidence of the light does not migrate.

Figure 3:
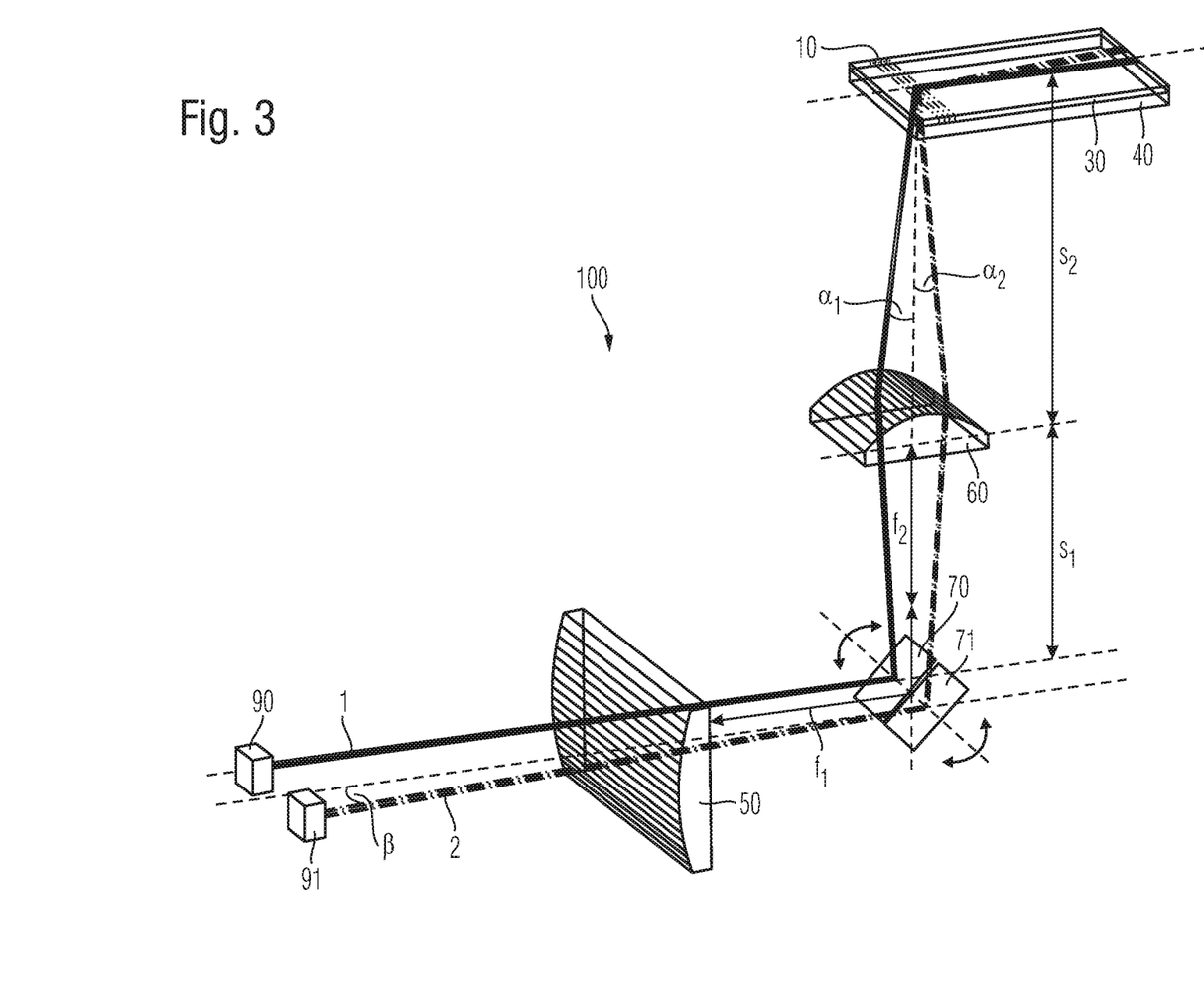
FIG. 3 shows the device according to an embodiment of the invention with a goniometer structure with two rotary mirrors.

FIG. 3 shows an embodiment of the device 100 according to an embodiment of the invention with a goniometer structure comprising two rotating mirrors 70, 71. The rotating mirrors 70, 71 are arranged in parallel in the optical path. A light source 91 is arranged at an angle β in a plane parallel to the planar waveguide and generates a light bundle am 2 having a wavelength $\lambda_2$. The second light source 90 is in the optical path and generates a light bundle 1 of the wavelength $\lambda_1$.

The light beams 1 and 2 are directed through the first lens 50 and hit the rotating mirrors 70, 71, with the light bundle 1 impinging on the rotary mirror 70 and the light bundle 2 on the rotary mirror 71. Both light bundles 1, 2 are then directed onto the waveguide with the grating coupler 10 by the second lens 60. In this case, the light bundle 1 impinges under the coupling angle $\alpha_1$ and the light bundle 2 under the coupling angle $\alpha_2$, wherein the coupling angle $\alpha_2$ also depends on the shear angle β, as indicated in formula (4). Due to the pulse retention, the light 2 irradiated under the sheared angle also extends slightly obliquely in the waveguide.

Figure 4:
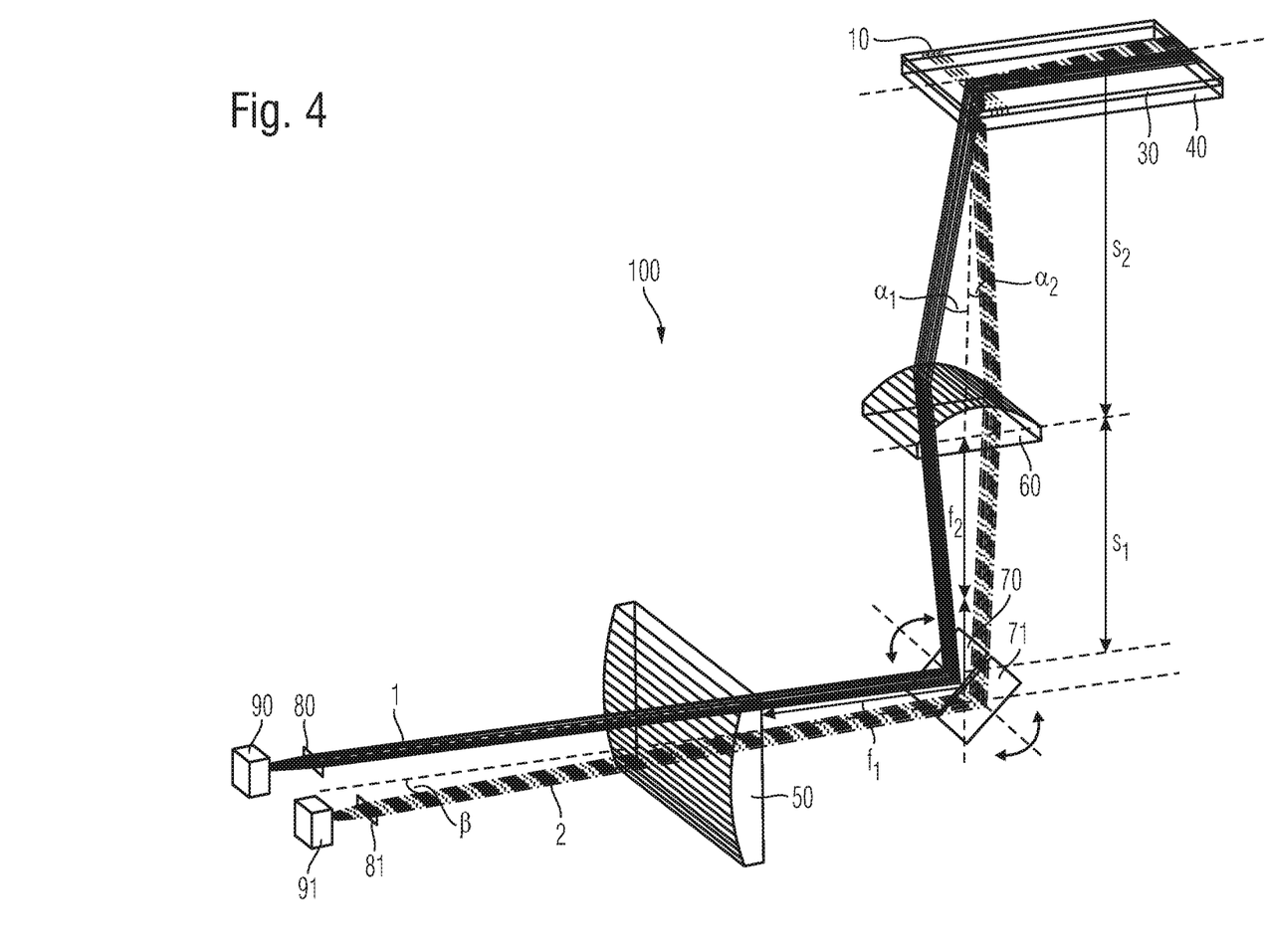
FIG. 4 shows the device according to an embodiment of the invention with a goniometer structure with two rotary mirrors and two means for shaping the irradiated light bundles.

FIG. 4 shows the device 100 according to an embodiment of the invention with a goniometer structure as described in FIG. 3. In addition, the device 100 according to an embodiment of the invention also has two means 80, 81 for shaping the light beams 1, 2. These means are arranged between the light sources 90, 91 and the first lens 50. The means for shaping the light beams 1, 2 according to an embodiment of the invention can be arrangements of cylindrical lenses and/or Powell lenses and/or a rotating polygonal beam offset prism. In a particularly advantageous embodiment, it is also possible to use only one common means 80, 81 for beam shaping both light sources 90, 91 which extends spatially over both partial beams.

The light bundle 1 passes through the light-shaping means 80, thereby producing a linear profile. The light bundle 1 passes through the optical path of the goniometer structure and is coupled via the grating coupler 10 into the waveguiding layer 30 of the waveguide under the coupling angle $\alpha_1$. The light beam 2 passes through the light-shaping means 81, thus generating a linear profile. The light source 91 which generates the light beam 2 is in this case sheared in a plane parallel to the planar waveguide at an angle β. The light bundle 2 passes through the optical path of the goniometer structure and is coupled into the waveguiding layer 30 of the waveguide via the grating coupler 10 under the coupling angle 2.

According to an embodiment of the invention, the two beam bundles 1, 2 are shaped in such a way that a line is formed along the grating coupler 10 so that the waveguide is illuminated over its entire width.

Figure 5:
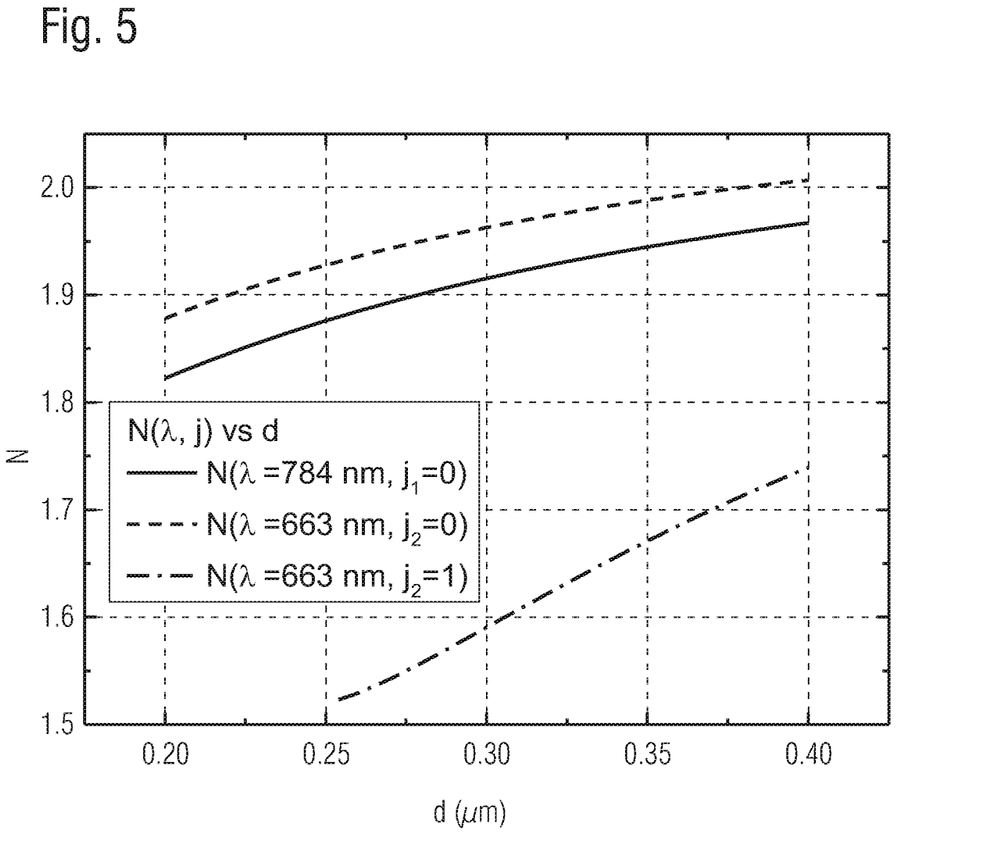
FIG. 5 shows the thickness of the waveguiding layer depending on the effective refractive index N.

FIG. 5 shows the numerically calculated effective refractive index of different bonded modes depending on the layer thickness d for a waveguide. The waveguide layer consists of tantalum pentoxide embedded between glass as substrate and silicon dioxide as covering layer. Shown are the effective refractive index N for $\lambda_1 = 784$ nm and the zeroth mode ($j_1 = 0$) and for $\lambda_2 = 663$ nm and the zeroth ($j_2 = 0$) and first ($j_2 = 1$) modes. N is shown only for bound solutions, so the application for the first mode at $\lambda_2 = 663$ nm begins only above d=250 nm.

Figure 6:
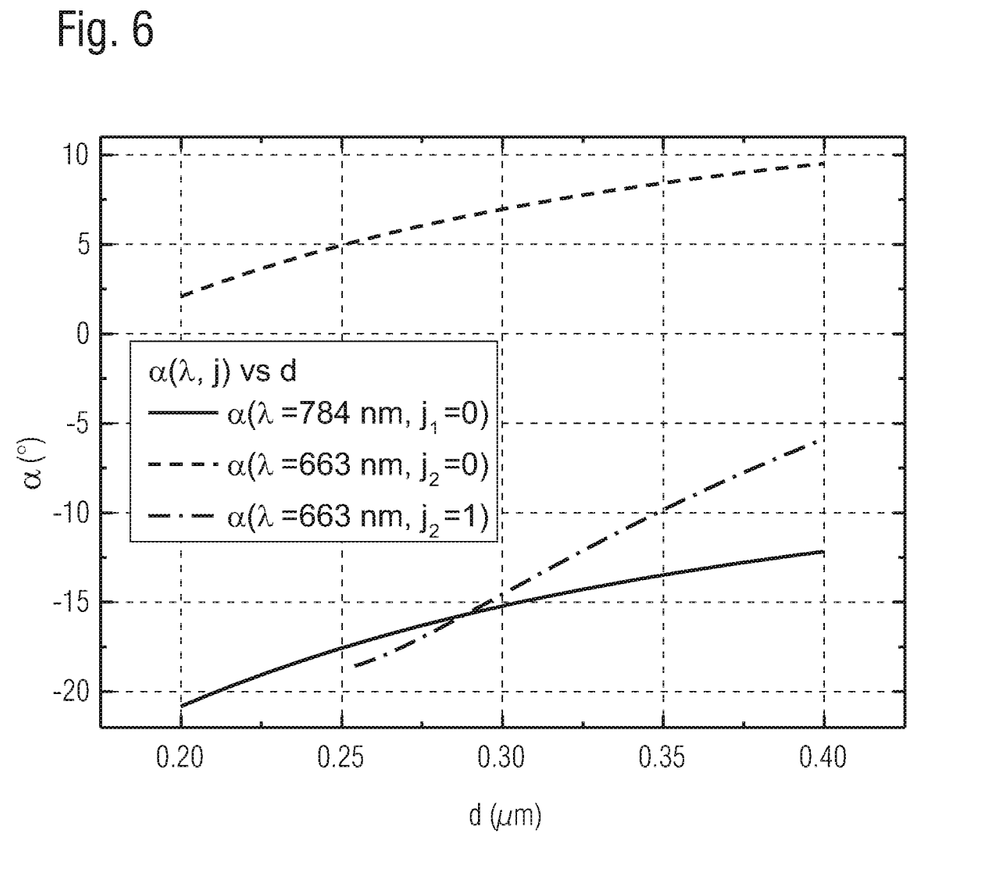
FIG. 6 shows the thickness of the waveguiding layer d as a function of the divergence angle α.

FIG. 6 shows the coupling angles α obtained when using the effective refractive indices N calculated in FIG. 5 at a coupler period of $\Lambda_K = 360$ nm in formula (2). The coupler period $\Lambda_K = 360$ nm was chosen according to formula 2 in order to obtain a coupling angle between -10 and -20° for the first wavelength $\lambda_1 = 784$ nm in $j_1 = 0$ mode. Small negative coupling angles are advantageous because uncoupled light from the light bundle directed onto the grating coupler continues to pass counter to the coupled light direction and cannot interfere with the measurements made by means of the coupled light.

From the intersection at d=0.288 Ξm and α=-15.7°, the thickness d necessary according to an embodiment of the invention as per formula (4) is obtained graphically for Δα=0°.

Exemplary Embodiment 1

The light from alight source having a wavelength $\lambda_1 = 784$ nm and the light from a light source having a wavelength $\lambda_2 = 663$ nm are coupled from the medium air through a grating coupler for example with a grating constant $\Lambda_K = 370$ nm and m=1 into a single-mode waveguide from prior art with an effective refractive index $N(\lambda_1, j_1=0) = 1.928$ and $N(\lambda_2, j_2=0) = 1.976$. According to formula (1), the result for the light with the wavelength $\lambda_1 = 784$ nm is a coupling angle of $\alpha_1 = -11.0°$ and for the light having the wavelength of $\lambda_2 = 663$ nm, there is a coupling angle of $\alpha_2 = +10.6°$. Accordingly, the divergence angle is $\Delta\alpha = |\alpha_1 - \alpha_2| \approx 20°$.

Exemplary Embodiment 2

Light from alight source with a wavelength of $\lambda_1 = 784$ nm and light from a light source with a wavelength of $\lambda_2 = 663$ nm from the medium air is coupled into a waveguide according to an embodiment of the invention. The waveguide having a waveguiding layer of $Ta_2O_5$ with a refractive index $n_W = 2.094$ and a thickness d=300 nm has a substrate layer D263 having a refractive index of $n_S = 1.517$. In the area of the grating coupler, the waveguiding layer is covered with a cover layer of $SiO_2$ which has a refractive index of $n_{D1} = 1.473$. Outside the grating coupler, a cover layer of air ($n_{D2} = 1.0$) or optionally water ($n_{D2} = 1.33$) adjoins the waveguiding layer. The light from both light sources is radiated into TE polarization. A light source emits light of the wavelength $\lambda_1 = 784$ nm which is used for dark-field illumination in the molography. This light is coupled into the zeroth mode of the waveguide, the effective refractive index is $N(\lambda_1, j_1=0) = 1.928$.

The second light source emits light of wavelength $\lambda_2 = 663$ nm that is suitable for fluorescence spectroscopy. The light source is sheared in a plane parallel to the planar waveguide by the angle β=8°. This light is coupled into the first mode of the waveguide ($j_2 = 1$, hence TE1); an effective refractive index of $N(\lambda_2, j_2=1) = 1.588$ then results for this mode. With a grating coupler constant of $\Lambda_K = 360$ nm, identical coupling angles $\alpha_1 = \alpha_2 = -14.4°$ are obtained, an thus a divergence angle of $\Delta\alpha = 0°$.

Since for a surrounding medium having a refractive index n>~1.45 for light of the wavelength $\lambda_1 = 784$ nm besides the zeroth mode, the first mode is also allowed, the device described is a multi-mode for the light of the first light source ($\lambda_1 = 784$ nm) in the area of the top layer of $SiO_2$ having the refractive index $n_{D1} = 1.473$, and in addition to the zeroth also the first mode is permitted. However, as soon as the light with this wavelength leaves the area of the cover layer of $SiO_2$ and strikes the medium from $n_{D2}=1.0$ (air) to $n_{D2}=1.33$ (water), only the zeroth mode is allowed and the waveguide is single mode. Advantageously, detection takes place in this area and undesired scattered light due to intermode scattering is effectively suppressed.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 1, 2 Light bundle
10 Grating coupler
20, 21 Cover layer
30 Waveguiding layer
40 Substrate layer
50, 60 Lens
70, 71 Rotating mirror
80, 81, 82 Lightbeam-shaping means
90, 91, 92 Light sources
100 Device

What is claimed is:

1. A device comprising:
a grating coupler with a grating constant;
at least two light sources;
a planar waveguide; and
a goniometer structure which has at least one rotating mirror and two lenses, and a virtual pivot point on the grating coupler,
wherein the grating coupler, the at least two light sources and the waveguide are configured to couple light with at least two different wavelengths $\lambda_1$, $\lambda_2$ into the waveguide,
wherein the waveguide has a waveguiding layer disposed adjacent to a substrate layer and a cover layer, the waveguiding layer having a thickness d and effective refractive indices of $N(\lambda_k, j_k)$, wherein $\lambda_k$ is one of the wavelengths of the coupled light and $j_k$ is an order of a waveguide mode, wherein the coupled light of the wavelength $\lambda_k$ has a coupling angle $\alpha_k$ into the waveguide, and wherein an amount of difference between the coupling angles of different ones of the at least two light sources is a divergence angle $\Delta\alpha$,
wherein the thickness d and the effective refractive indices of $N(\lambda_k, j_k)$ of the waveguiding layer are such that waveguide modes of the order $j_k>0$ are guided for at least one of the at least two different wavelengths of the coupled light, and
wherein the waveguiding layer is arranged to couple the light having the at least two different wavelengths via the grating coupler under a divergence angle of $\Delta\alpha<6°$.

2. The device according to claim 1, wherein the divergence angle $\Delta\alpha$ is less than $3°$.

3. The device according to claim 1, wherein the at least two wavelengths of the light from the at least two light sources each differ by at least $\Delta\lambda=100$ nm.

4. The device according to claim 1, wherein one of the at least two light sources has a wavelength in a range of 600 nm-1000 nm, and wherein another one of the at least two light sources has a wavelength in a range of 400 nm-700 nm.

5. The device according to claim 1, further comprising a goniometer structure which has two rotating mirrors.

6. The device according to claim 1, wherein at least the irradiated light of the wavelength $\lambda_k$ of at least one of the light sources has a line profile along the grating coupler.

7. The device according to claim 1, further comprising at least one component for lightbeam shaping which is at least one of a cylindrical lens, a Powell lens, a rotating polygonal beam offset prism, a beam combiner, or a collimating lens.

8. A method comprising using the device according to claim 1 for dark field excitation in molography and fluorescence spectroscopy.

9. The device according to claim 1, wherein the thickness d and the effective refractive indices of $N(\lambda_k, j_k)$ of the waveguiding layer are such that the light of a first one of the wavelengths $\lambda_1$ is coupled with a first coupling angle $\alpha_1$ into a first waveguide mode $j_1$ and the light of a second one of the wavelengths $\lambda_2<\lambda_1$ is coupled with a second coupling angle $\alpha_2$ into a second waveguide mode $j_2$, with $j_2>j_1$.

10. A method for coupling light from at least two different light sources having different wavelengths via a grating coupler with a grating period into a waveguide, the method comprising:
irradiating the light from the at least two different light sources having the different wavelengths onto the grating coupler using a goniometer structure which has at least one rotating mirror and two lenses, and a virtual pivot point on the grating coupler;
coupling the light of a first one of the wavelengths $\lambda_1$ with a first coupling angle $\alpha_1$ into a first waveguide mode $j_1$ and the light of a second one of the wavelengths $\lambda_2<\lambda_1$ with a second coupling angle $\alpha_2$ into a second waveguide mode $j_2$, with $j_2>j_1$,
wherein an amount of difference between the coupling angles from the at least two different light sources is $\Delta\alpha<6°$.

11. The method according to claim 10, further comprising coupling light from at least one further light source with at least one further wavelength $\lambda_k<\lambda_2<\lambda_1$ into at least one further waveguide mode $j_k$ with at least one further coupling angle $\alpha_k$, with $j_k>j_2>j_1$.

12. The method according to claim 10, wherein the light of the at least two light sources having the different wavelengths is coupled into the grating coupler by a goniometer structure having a virtual pivot point.

13. The method according to claim 10, wherein the light of the at least two different light sources is coupled in a collinear manner at the different wavelengths.

14. The method according to claim 10, wherein the light of the at least two different light sources having the different wavelengths is coupled into the waveguide at a same time, or wherein the light having one of the different wavelengths and at least the light having another one of the different wavelengths are coupled in one after the other.

15. The method according to claim 10, wherein at least an optical path of the light having one of the different wavelengths is sheared at an angle $\beta$ in a plane parallel to the waveguide.

16. The method according to claim 10, wherein the light of at least one of the at least two different light sources is shaped in such a way that a line profile results along the grating coupler.

\* \* \* \* \*